Sept. 26, 1967   F. M. PRIDDY   3,343,849
ANGULARLY SWINGABLE AND LATERALLY ADJUSTABLE TRACTOR HITCHES
Filed Jan. 19, 1966
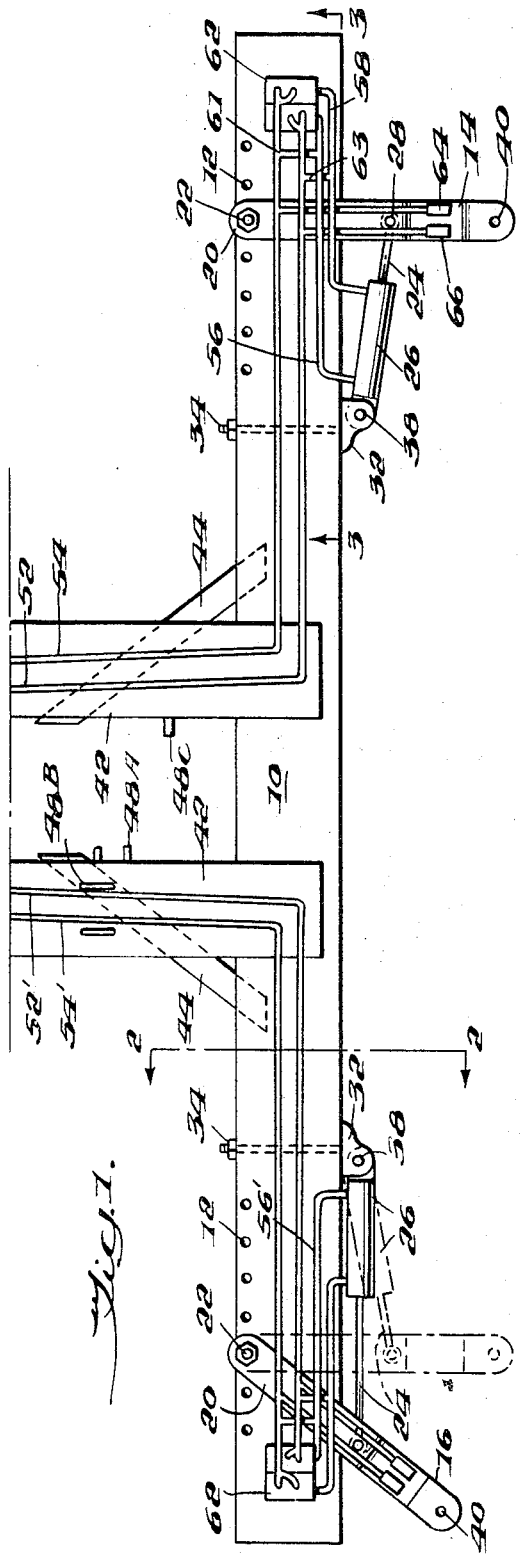
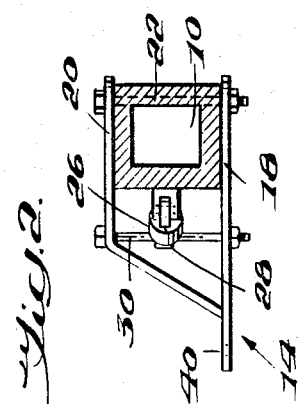
INVENTOR
FRANCIS M. PRIDDY,
BY McLean, Morton & Boustead
ATTORNEYS

United States Patent Office 3,343,849
Patented Sept. 26, 1967

3,343,849
ANGULARLY SWINGABLE AND LATERALLY ADJUSTABLE TRACTOR HITCHES
Francis M. Priddy, % Joe Priddy and Sons, Rte. 2, Box 250, Rolling Fork, Miss. 39159
Filed Jan. 19, 1966, Ser. No. 521,570
1 Claim. (Cl. 280—412)

The present application relates to a hitch of the type used for securing agricultural implements to a tractor.

In the hitching of ground-engaging agricultural implements to a tractor various previous inventors have devised means for enhancing the rigidity of the hitch as well as facilitating the pivoting of the ground-engaging implements about the hitch, as it is desired to float the implements over obstructions upon the ground or to raise the implements from the ground. A principal shortcoming of conventional hitches, however, has been the rigidity of suspension of the agricultural implements when the tractor and implements are required to traverse turns which rigidity promotes breaking of the hitch or jamming of the adjacent implements. According to the present invention, a rigid support bar and a pair of pivoted hitches, e.g., hydraulic piston-cylinder operated hitches are interposed between the tractor and a rigid portion of the agricultural implement frame. The piston-cylinder assemblies are operated by the tractor hydraulic system to swing the individual hitches and the implement attached thereto outwardly as the tractor traverses a turn and prevent the ground-engaging implements from jamming.

The present invention will be more fully understood from the detailed description hereinbelow and the accompanying drawings in which:

FIGURE 1 is a top plan view of the hitch in accordance with this invention;

FIGURE 2 is an end view of the hitch illustrating the swinging draw bar; and

FIGURE 3 is a partial front view of the hitch.

Referring now to FIGURE 1, the hitch in accordance with this invention generally comprises a support bar 10 having extending therethrough along the upper front edge a series of holes 12. Holes 12 are preferably arranged at the two ends of the support bar 10, but may extend the full length thereof if desired. Adjustable swinging draw bars, generally designated 14 and 16, are secured to the opposite ends of the support bar 10 by means of holes 12. Each swinging draw bar includes, see FIGURE 2, a lower bar 18 arranged beneath the support bar 10 and an upper bar 20 above support bar 10. Bar 20 is bent at one end and is welded or otherwise attached to lower bar 18. The ends of bars 18 and 20 opposite the connection thereof extend over support bar 10 and include apertures which will match holes 12 in support bar 10 so that the swinging draw bar can be attached to the support bar, i.e., by bolts 22 which pass through the apertures in lower bar 18 and upper bar 20 as well as holes 12 in support bar 10. This connection provides a pivotal attachment of the swinging bar to the forward end of support bar 10. Each of the swinging draw bars 14 and 16 is additionally secured to the support bar 10 by a piston 24 and cylinder 26 assembly. Each piston 24 is secured to a respective swinging draw bar 14 or 16 by a pivotal connection 28 at rod or bolt 30 which is secured between the lower and upper bars 18 and 20 for the respective swinging draw bar 16 or 14. Each cylinder 26 is secured to the support bar 10 through a support element 32 which is bolted, i.e., bolts 34, to the support bar 10 through the support bar. Apertures 36 are provided in the support bar 10 as shown in FIGURE 3 for bolts 34 which are selectively positioned in a respective aperture 36. Each cylinder 26 is pivotally secured at 38 to a support element 32.

The swinging draw bars 14 and 16 are each adapted to have a farm implement attached thereto, for example, at aperture 40 in each of the draw bars 14 and 16. The support bar 10 is adapted to be secured to a tractor vehicle at the side thereof opposite the swinging draw bars 14 and 16. Means for securing the support bar 10 to a tractor is shown in the form of lower bar elements 44 and upper bar elements 42 having means at their front ends (not shown) for attachment to a tractor vehicle. A pull hook 46 is also secured to the support bar for convenience. Additionally, hook elements 48B are provided on an upper attachment bar 42 for a shovel, etc., which may be required in field use of the hitch of this invention. Additionally, the well provided between the various attaching bars 42 and 44 provides a convenient means for carrying optional equipment and support hooks 48A are provided for this purpose. Support attachment 48C makes a convenient tire carrying rack.

In operation, the adjustable swinging draw bars 14 and 16 are adapted to be moved inwardly and outwardly on support bar 10. The tractor vehicle will have available a hydraulic fluid supply system which is used to operate the piston 24-cylinder 26 assemblies to pivot the adjustable swinging draw bars inwardly and outwardly of the support bar 10. Conduits 52, 54, 56, and 58 are provided for supplying hydraulic fluid to the cylinders 26 on the opposite sides of the system elements attached to rods 24 inside of the cylinders. The cylinder 26 forming a part of the adjustable swinging draw bar 14 has conduits 52 and 54 operatively connected thereto at opposite ends. Conduit 52 is connected to one end of cylinder 26 through a delayed valve arrangement 60 to supply fluid to the left hand side of cylinder 26 through conduit 56 and pivot the swinging draw bar 14 outwardly of the support bar 10. Alternately, hydraulic fluid may be supplied through conduit 54, delay valve 62 and conduit 58 to the right hand side of piston 26 to pull the swinging draw bar inwardly of the support bar 10. Bleed off lines 61 and 63 are provided, respectively, for the delay valves 60 and 62. When hydraulic fluid is supplied through conduit 52 to swing the draw bar 14 outwardly of the support bar 10, hydraulic fluid is removed from the right end of cylinder 26 through bleed off line 63 in accordance with normal hydraulic systems. Snap couplers 64 and 66 are connected to hydraulic supply lines 52 and 54, respectively, to provide a source of hydraulic fluid for an implement which may be attached at the swinging draw bar. The hydraulic system for operating swinging draw bar 16 is similar to that for operating draw bar 14 and includes supply lines 52' and 54' to supply hydraulic fluid to the opposite sides of the left cylinder 26 through valves 60' and 62', respectively. Bleed off lines 61' and 63' are also included as are snap couplers 64' and 66'. In operation, the hydraulic piston-cylinder assemblies will be actuated to move swinging draw bars 14 and 16 outwardly when the tractor turns to separate implements attached thereto. Additionally, the draw bars will be used to separate the implements when they are raised. The spaced apertures 12 and 36 allow the piston-cylinder assemblies to be secured to bar 10 for attachment of different size implements to the tractor.

It is claimed:

A tractor hitch of the type for attaching an agricultural implement to a tractor comprising: A rigid bar adapted to be secured to said tractor, said rigid bar having a first plurality of spaced apertures extending therethrough along the top forward edge at least at the ends thereof and a second plurality of spaced apertures extending therethrough from front to back spaced inwardly of the ends of said rigid bar, a swinging draw bar at each end of said rigid bar comprising a lower bar extending beneath said rigid bar and an upper bar extending above said rigid bar, one end of each of said upper and lower bars forming a respective draw bar being secured to a bolt removably arranged in one of said first plurality of apertures, a hydraulic piston-cylinder assembly for each said draw bar pivotally attached at one end to said draw bar and at the other end to a support member, each said support member being removably secured in a respective one of said second series of apertures, and a hydraulic system connected to each said piston-cylinder unit for selectively moving said piston inwardly and outwardly whereby the draw bar attached to the piston-cylinder unit is moved inwardly and outwardly of said rigid bar.

References Cited

UNITED STATES PATENTS

| 2,316,397 | 4/1943 | Briscoe | 280—463 |
| 2,600,016 | 6/1952 | Miller | 280—468 |
| 2,709,085 | 5/1955 | Stueland | 280—412 |

LEO FRIAGLIA, *Primary Examiner.*